Jan. 3, 1956     L. M. EMSLIE     2,729,118
GEARLESS DIFFERENTIAL
Filed April 25, 1955

*INVENTOR.*
LYELL M. EMSLIE
BY Leonard H. King
AGENT

2,729,118
GEARLESS DIFFERENTIAL
Lyell M. Emslie, Jamaica, N. Y.

Application April 25, 1955, Serial No. 514,670

7 Claims. (Cl. 74—650)

This invention relates to differential mechanism and particularly to gearless differential mechanisms.

A limitation to the use of differential gear mechanisms in computers and servo mechanisms has been backlash and the high cost of precision gears. There is disclosed herein a simple gearless differential free from backlash. The apparatus of this invention is to be differentiated from differentials employed as power transmissions.

It is an object of this invention to provide a differential free from backlash.

A further object of this invention is to provide a differential mechanism suitable for use in computing mechanisms.

Still another object of this invention is to provide a precision differential of simple construction.

A different object of this invention is to provide a relatively low cost precision differential mechanism.

Still other objects, features and advantages of the present invention are those implied from or inherent in the novel combination and arrangement of parts as will become more clearly apparent from the following detailed description taken with reference to the accompanying drawings wherein.

Figure 3:
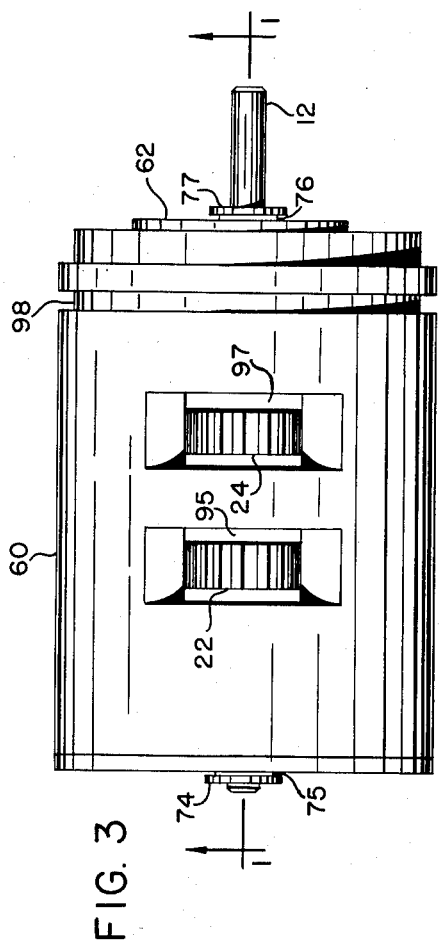
Figure 3 is a plan view of the differential mechanism of this invention.
Figure 1:
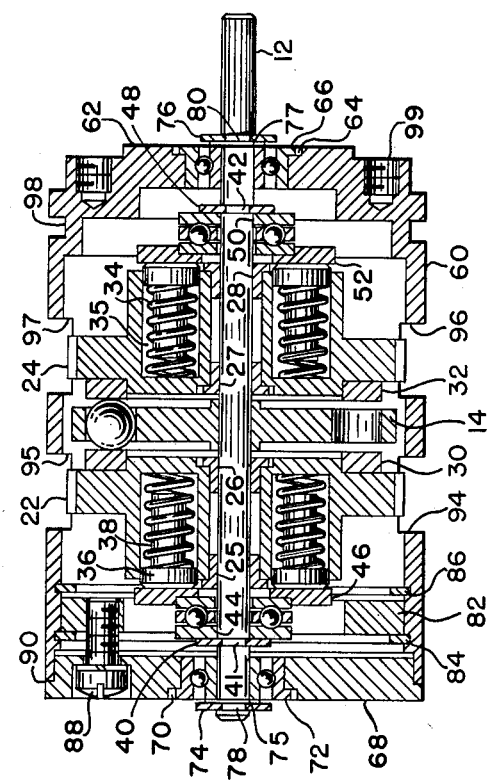
Figure 1 is a cross-sectional view taken in elevation along plane 1—1 of Figure 3 of a preferred form of the differential of this invention.
Figure 2:
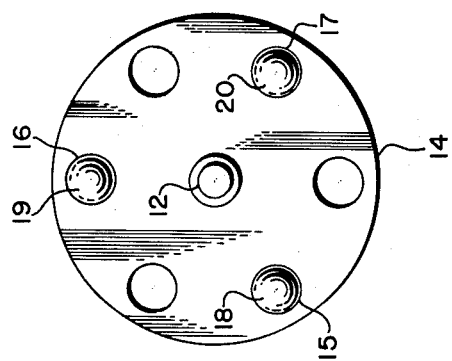
Figure 2 is an end view of a shaft and spider forming a portion of the differential of this invention.

Referring to Figure 1, there is disclosed a shaft 12 upon which is mounted, in a fixed relationship, thereto a perforated disc shaped spider 14. This assembly is shown in an end view in Figure 2. In each of three holes 15, 16 and 17 of spider 14 there is positioned a tungsten carbide ball 18, 19 and 20. While a greater number of balls may be employed, three is a preferred number as they define a single plane. Gears 22 and 24 are rotatably mounted on shaft 12 by means of bearings 25 and 26, and 27 and 28, respectively. Gears 22 and 24 have press fit thereto durable tungsten carbide facing rings 30 and 32 which are positioned so as to contact balls 18, 19 and 20 as shown. Rings 30 and 32 are carefully lapped to provide a flat surface. They may be composed of tungsten carbide or other substance providing like suitable wear and machinability characteristics.

In order to maintain constant contact between discs 30 and 32 and balls 18, 19 and 20, a plurality of springs 34 are provided. The springs are positioned in cylindrical recesses 35 and act between heads 36 of pins 38 and the bottoms of recesses 35. Three such springs 34 acting on each gear 22 and 24 is adequate for a precision differential gear mechanism as utilized in applications for which the product of this invention is primarily intended. Where the applied torque necessitates greater pressure, a greater number of springs and balls may be employed.

Pins 38 and therefore gear 22 is restricted in axial movement by means of: lock ring 40 set in groove 41, bearing assembly 44, and plate member 46. Likewise gear 24 is restricted by lock ring 48, bearing assembly 50 and plate member 52. Groove 42 is provided to receive lock ring 48.

Thus as mechanical motion is transmitted to each of gears 22 and 24, the difference in their relative rates of rotation corresponds to the rotation of spider 14 and in turn shaft 12.

A housing 60 having a first end portion 62 is provided with a central bearing opening 64 for supporting shaft 12 by means of bearing 66 positioned in said opening. A second end portion 68 is provided with a central bearing opening 70 fitted with a bearing 72 which also supports shaft 12. Axial movement of the shaft in the housing is prevented by lock rings 74 and 76, inserted in grooves 78 and 80 and shims 75 and 77.

Clamping ring 82 is held captive by lock rings 84 and 86. Screws 88 clamp second end portion 68 and clamping ring 82 together so that stepped portion 90 of end 68 is seated against housing 60. Clamping ring 82 is seated against lock ring 84.

Slots 94, 95, 96 and 97 milled into housing 60 permit external engagement of spur gears 22 and 24.

Housing 60 is provided with a servo mount 98 such as commonly employed for mounting the standard military MK8 Mod 0 servomotor. Screw holes 99 provide an alternate mounting means.

In its customary mode of operation information is mechanically inserted into the differential by rotation of gears 22 and 24 and output information is derived from shaft 12.

While I have disclosed the best mode currently contemplated for carrying out this invention, it is to be understood that changes may be made without departing from the spirit and scope of the invention as hereinafter claimed.

I claim as new:

1. A gearless differential comprising in combination: a cylindrical housing provided with slotted openings at right angles to the axis of said housing, a servo mount means forming part of said housing, first and second end portions provided with centrally positioned bearing receiving openings, bearing members located in each of said openings, a shaft supported by said bearing members, means for preventing axial movement of said shaft in said bearings, a spider fixed to said shaft, balls carried by said spider, a first gear having teeth exposed to one of said slotted openings and rotatably and slidably mounted on said shaft, a first flat surface member driven by said first gear, spring means to maintain said first flat surface member in engagement with said balls, a second gear having teeth exposed to one of said slotted openings and rotatably and slidably mounted on said shaft, a second flat surface member driven by said second gear, and spring means to maintain said second flat surface member in engagement with said balls.

2. A gearless differential comprising in combination: a cylindrical housing provided with slotted openings at right angles to the axis of said housing, a servo mount means forming part of said housing, first and second end portions provided with centrally positioned bearing receiving openings, bearing members located in each of said openings, a shaft supported by said bearing members, means for preventing axial movement of said shaft in said bearings, a spider fixed to said shaft, three balls carried by said spider, a first gear having teeth exposed to one of said slotted openings and rotatably and slidably mounted on said shaft, a first flat surface member driven by said first gear, spring means to maintain said first flat surface member in engagement with said balls, a second gear having teeth exposed to one of said slotted openings and rotatably and slidably mounted on said shaft, a second flat surface member driven by said second gear, and spring means to maintain said second flat surface member in engagement with said balls.

3. A gearless differential comprising in combination: a cylindrical housing provided with slotted openings at right angles to the axis of said housing, a servo mount means forming part of said housing, first and second end portions provided with centrally positioned bearing receiving openings, bearing members located in each of said openings, a shaft supported by said bearing members, means for preventing axial movement of said shaft in said bearings, a spider fixed to said shaft, three tungsten carbide balls carried by said spider, a first gear having teeth exposed to one of said slotted openings and rotatably and slidably mounted on said shaft, a first flat surface tungsten carbide member driven by said first gear, spring means to maintain said first flat surface member in engagement with said balls, a second gear having teeth exposed to one of said slotted openings and rotatably and slidably mounted on said shaft, a second flat surface tungsten carbide member driven by said second gear, and spring means to maintain said second flat surface member in engagement with said balls.

4. A gearless differential comprising in combination: a cylindrical housing provided with slotted openings at right angles to the axis of said housing, a servo mount means forming part of said housing, first and second end portions provided with centrally positioned bearing receiving openings, bearing members located in each of said openings, a shaft supported by said bearing members, means for preventing axial movement of said shaft in said bearings, a spider fixed to said shaft, balls carried by said spider, a first gear having teeth exposed to one of said slotted openings and rotatably and slidably mounted on said shaft, a first flat surface member driven by said first gear, spring means to maintain said first flat surface member in engagement with said balls, a second gear having teeth exposed to one of said slotted openings and rotatably and slidably mounted on said shaft, a second flat surface member driven by said second gear, and spring means to maintain said second flat surface member in engagement with said balls, each of said spring means comprising headed pins and compressible coil springs held captive by said headed pins, said pins and springs being positioned in cylindrical recesses in said gear members and a plate positioned in contact with said headed pins, said plate being rotatably mounted by means of a thrust bearing supported by said shaft.

5. A gearless differential comprising in combination: a cylindrical housing provided with slotted openings at right angles to the axis of said housing, a servo mount means forming part of said housing, first and second end portions provided with centrally positioned bearing receiving openings, bearing members located in each of said openings, a shaft supported by said bearing members, means for preventing axial movement of said shaft in said bearings, a spider fixed to said shaft, three tungsten carbide balls carried by said spider, a first gear having teeth exposed to one of said slotted openings and rotatably and slidably mounted on said shaft, a first flat surface tungsten carbide member driven by said first gear, spring means to maintain said first flat surface member in engagement with said balls, a second gear having teeth exposed to one of said slotted openings and rotatably and slidably mounted on said shaft, a second flat surface tungsten carbide member driven by said second gear, and spring means to maintain said second flat surface member in engagement with said balls, each of said spring means comprising headed pins and compressible coil springs held captive by said headed pins, said pins and springs being positioned in cylindrical recesses in said gear members and a plate positioned in contact with said headed pins, said plate being rotatably mounted by means of a thrust bearing supported by said shaft.

6. A gearless differential comprising in combination: a shaft, a spider fixed to said shaft, a plurality of tungsten carbide balls carried by said spider, a first driven member rotatably mounted on said shaft, a first tungsten carbide plate supported by said first driven member and arranged to engage said balls, a second driven member rotatably mounted on said shaft, a second tungsten carbide plate supported by said second driven member, and means for maintaining said first and said second tungsten carbide plates in contact with said balls, said last named means comprising a first plate rotatably mounted on said shaft, a plurality of compressible springs interposed between said first plate and said first driven member, means to restrain said first plate from axial movement in a direction away from said first driven member, a second plate rotatably mounted on said shaft, a plurality of compressible spring members interposed between said second plate and said second drive member and means for restraining the axial movement of said second plate in a direction away from said second drive member.

7. A gearless differential comprising in combination: a rotatable shaft, a spider, balls carried by said spider, a first spur gear member rotatably mounted on said shaft, a second spur gear rotatably mounted on said shaft with said spider interposed between said spur gears, flat surface members driven by each of said spur gears and adapted to engage said balls, a first plate member mounted so as to be rotatable on an axis common with said shaft, means to axially position said first plate member, a compressed spring means interposed between said first plate member and said first gear member so as to maintain said flat surface member driven by said first gear member in engagement with said balls, a second plate member mounted so as to be rotatable on an axis common with said shaft, means to axially position said second plate member, compressed spring means interposed between said second plate member and said second gear member so as to maintain said flat surface member driven by said second gear member in engagement with said balls, a housing provided with slots coinciding with the position of said first and second gears, and bearing members carried by said housing for rotatably supporting said shaft.

References Cited in the file of this patent

UNITED STATES PATENTS 2,680,972 Tone      June 15, 1954

FOREIGN PATENTS

515 Great Britain     Jan. 8, 1913